(12) United States Patent
Edwards et al.

(10) Patent No.: US 8,352,939 B1
(45) Date of Patent: Jan. 8, 2013

(54) SYSTEM, METHOD AND COMPUTER PROGRAM PRODUCT FOR PERFORMING A SECURITY OR MAINTENANCE OPERATION IN ASSOCIATION WITH VIRTUAL DISK DATA

(75) Inventors: Jonathan L. Edwards, Portland, OR (US); John D. Teddy, Portland, OR (US); Tracy E. Camp, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 1435 days.

(21) Appl. No.: 11/949,609

(22) Filed: Dec. 3, 2007

(51) Int. Cl.
G06F 9/455 (2006.01)
G06F 9/46 (2006.01)
G06F 9/44 (2006.01)
G06F 7/00 (2006.01)
G06F 17/30 (2006.01)
G06F 12/00 (2006.01)

(52) U.S. Cl. ............ 718/1; 718/100; 717/168; 707/755; 707/821; 707/822; 707/823; 707/828; 707/831

(58) Field of Classification Search .................. None
See application file for complete search history.

(56) References Cited

U.S. PATENT DOCUMENTS

| | | | | |
|---|---|---|---|---|
| 6,075,938 | A * | 6/2000 | Bugnion et al. | 703/27 |
| 6,363,421 | B2 * | 3/2002 | Barker et al. | 709/223 |
| 6,691,113 | B1 * | 2/2004 | Harrison et al. | 1/1 |
| 7,356,679 | B1 * | 4/2008 | Le et al. | 713/1 |
| 2004/0230972 | A1 * | 11/2004 | Donovan et al. | 718/1 |
| 2006/0236127 | A1 * | 10/2006 | Kurien et al. | 713/193 |
| 2007/0150886 | A1 * | 6/2007 | Shapiro | 717/174 |
| 2008/0028052 | A1 * | 1/2008 | Currid et al. | 709/222 |
| 2008/0134177 | A1 * | 6/2008 | Fitzgerald et al. | 718/1 |
| 2008/0244579 | A1 * | 10/2008 | Muller | 718/100 |
| 2008/0271019 | A1 * | 10/2008 | Stratton et al. | 718/1 |
| 2008/0307414 | A1 * | 12/2008 | Alpern et al. | 718/1 |
| 2009/0007105 | A1 * | 1/2009 | Fries et al. | 718/1 |

OTHER PUBLICATIONS

Pfaff et al. Virtualization Aware File Systems: Getting Beyond the Limitations of Virtual Disks. [online] (Jul. 20, 2006) ACM, pp. 1-14. Retrieved From the Internet <http://dl.acm.org/citation.cfm?id=1267706>.*

"Universal Command Guide for Operating Systems," Tom's Hardware, http://www.tomshardware.com/ucg/commands/vmmount-14339.html, Nov. 30, 2007.

"Mount-VHD Function," Microsoft Corporation, 2007, http://msdn2.microsoft.com/en-us/library/bb309135.aspx.

"Linux/Unix Command: chroot," About.com: Focus on Linux, About.com, Inc., 2007, http://linux.about.com/library/cmd/blcmd12_chroot.htm.

* cited by examiner

*Primary Examiner* — Emerson Puente
*Assistant Examiner* — Jonathan R Labud
(74) *Attorney, Agent, or Firm* — Wong, Cabello, Lutsch, Rutherford & Brucculeri LLP

(57) ABSTRACT

A system, method and computer program product are provided for performing a security or maintenance operation in association with virtual disk data accessed independent of a virtual machine. In use, data stored on a virtual disk is accessed at least in part independent of a virtual machine. Further, a security or maintenance operation is performed in association with the accessed data.

19 Claims, 8 Drawing Sheets

SYSTEM, METHOD AND COMPUTER PROGRAM PRODUCT FOR PERFORMING A SECURITY OR MAINTENANCE OPERATION IN ASSOCIATION WITH VIRTUAL DISK DATA

FIELD OF THE INVENTION

The present invention relates to virtual disks, and more particularly to accessing data stored on virtual disks.

BACKGROUND

Virtual machines have traditionally been provided for allowing at least one virtual system to operate within a single physical system. In general, each virtual machine utilizes a virtual disk for storing data, which may be partitioned from a physical disk of the physical system or a file located on the physical system file system. However, performing operations with respect to data accessed from the virtual disk has conventionally been limited.

For example, data stored on the virtual disk is usually accessible via an associated virtual machine, such that execution of the virtual machine has provided access to the data. Accordingly, performing operations with respect to the virtual disk data has customarily required execution of the virtual machine. There is thus a need for addressing these and for other issues associated with the prior art.

SUMMARY

A system, method and computer program product are provided for performing a security or maintenance operation in association with virtual disk data accessed independent of a virtual machine. In use, data stored on a virtual disk is accessed at least in part independent of a virtual machine. Further, a security or maintenance operation is performed in association with the accessed data.

DETAILED DESCRIPTION

Figure 1:
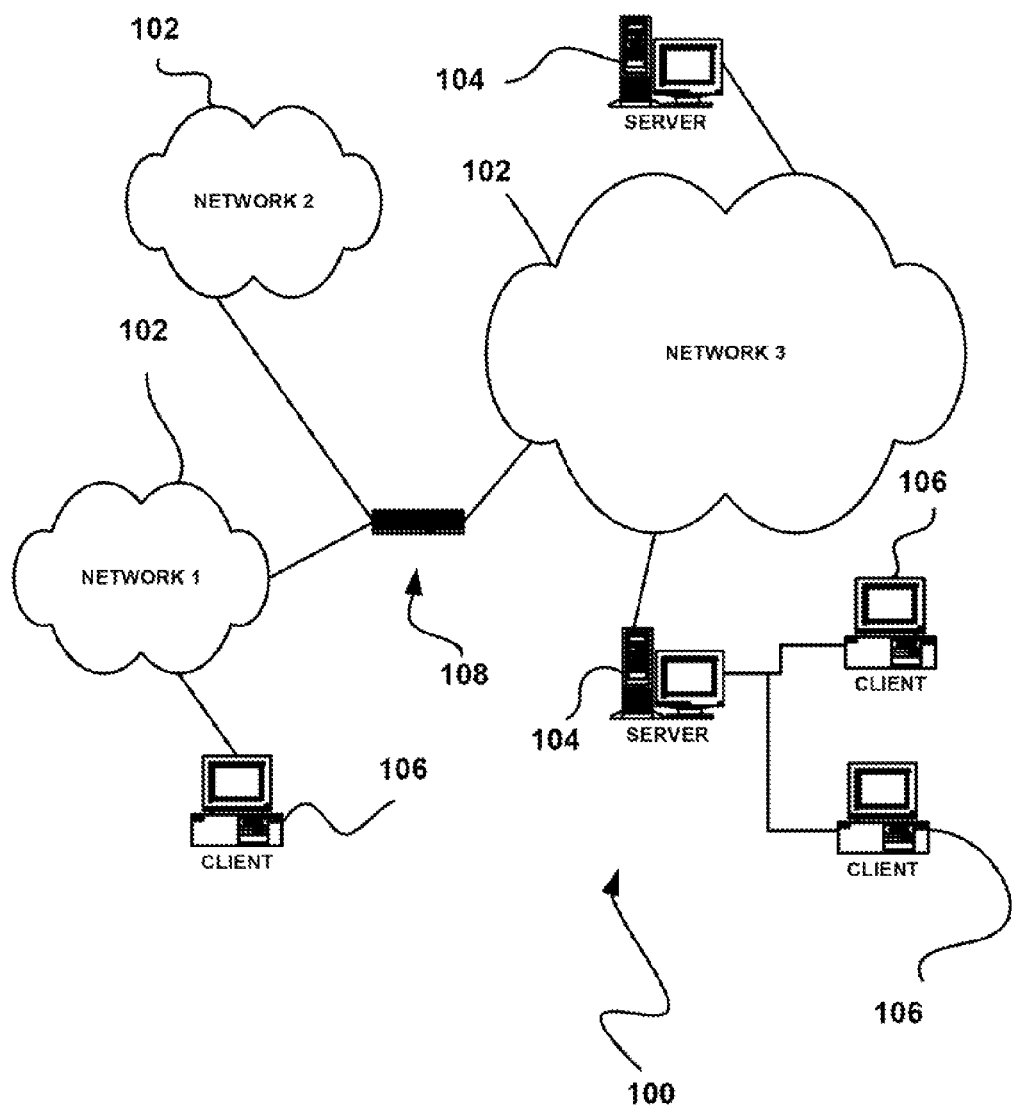
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, a peer-to-peer network, a personal area network (PAN), etc.

Coupled to the networks 102 are servers 104 which are capable of communicating over the networks 102. Also coupled to the networks 102 and the servers 104 is a plurality of clients 106. Such servers 104 and/or clients 106 may each include desktop computer, lap-top computer, hand-held computer, mobile phone, personal digital assistant (PDA), peripheral (e.g., printer etc.), any component of a computer, and or any other type of logic. In order to facilitate communication among the networks 102, at least one gateway 108 is optionally coupled therebetween.

Figure 2:
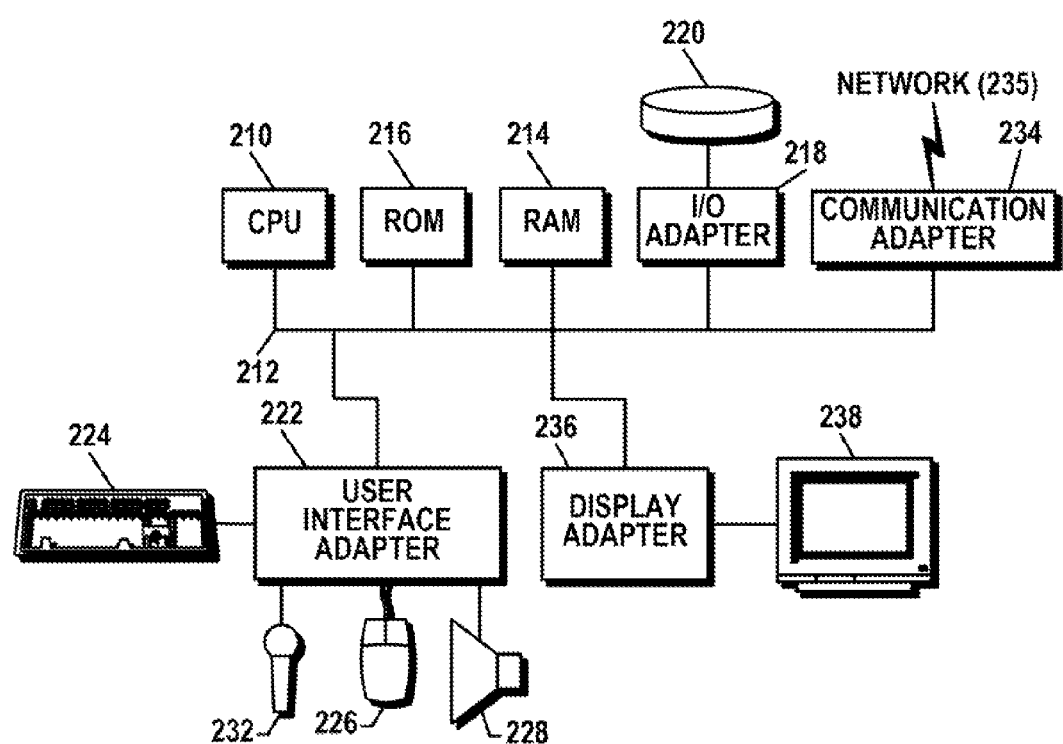
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
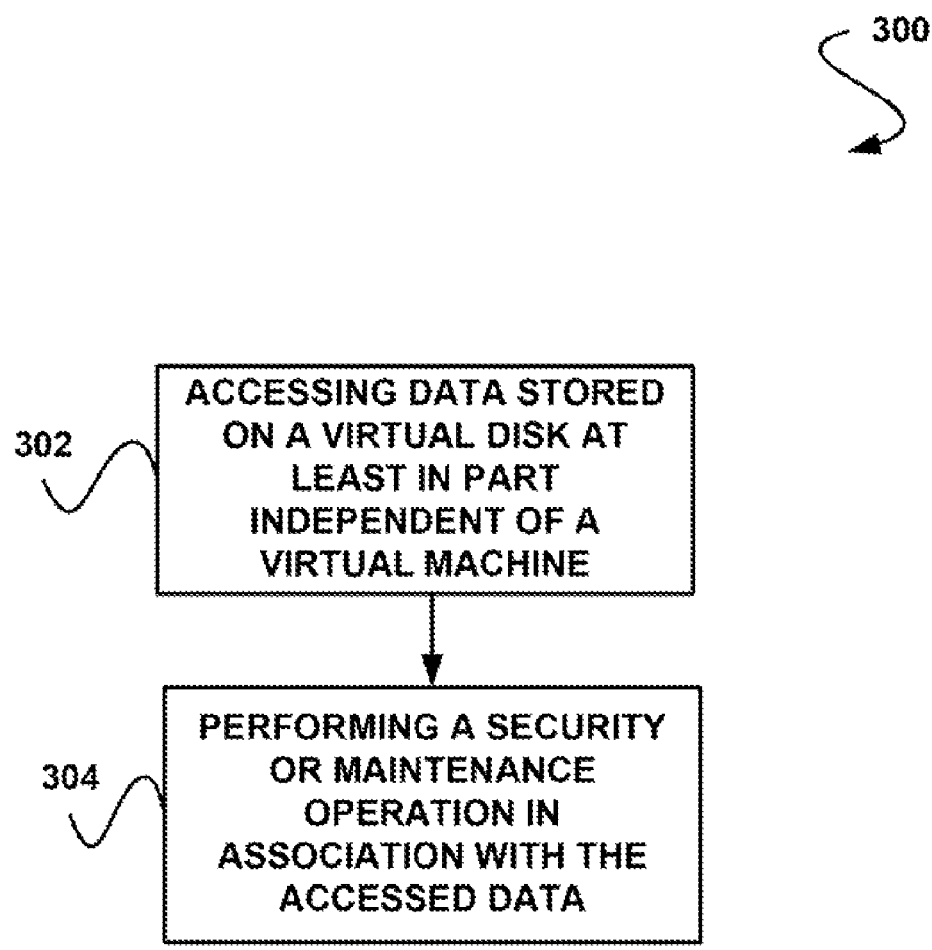
FIG. 3 shows a method for performing a security or maintenance operation in association with virtual disk data accessed independent of a virtual machine, in accordance with one embodiment.

FIG. 3 shows a method 300 for performing a security or maintenance operation in association with virtual disk data accessed independent of a virtual machine, in accordance with one embodiment. As an option, the method 300 may be carried out in the context of the architecture and environment of FIGS. 1 and/or 2. Of course, however, the method 300 may be carried out in any desired environment.

As shown in operation 302, data stored on a virtual disk is accessed at least in part independent of a virtual machine. In the context of the present description, the virtual machine may include any virtual implementation of a physical system, such as a computer system for example. Thus, in one possible embodiment, the virtual machine may perform functions similar to any physical system, including execution of an operating system. Further, the virtual machine may be implemented within a physical system (e.g. within any of the devices described above with respect to FIGS. 1 and/or 2).

Optionally, the virtual machine may utilize physical hardware of the physical system, while maintaining isolation from the physical system.

Also in the context of the present description, the virtual disk may include any portion of memory that is employed virtually. Such virtual disk may be dedicated for use by the virtual machine, for example. In one embodiment, the virtual disk may include at least a portion of a physical disk (e.g. hard disk) of the physical system. In another embodiment, the virtual disk may include a file within a file system used by an operating system of the physical system. Utilizing the file within the file system as the virtual disk may optionally provide portability to the associated virtual machine. Just by way of example, files associated with the virtual machine may be backed-up and/or copied to any other physical system, such that the virtual machine may operate on such other physical system.

To this end, the data stored on the virtual disk may include any desired content. Just by way of example, the data may be associated with (e.g. utilized by, etc.) the virtual machine. In various embodiments, the data may include file system data (e.g. data representing a file system of the virtual machine), registry data (e.g. data representing a registry utilized by the virtual machine), operating system files, application files, data files, etc.

Moreover, the data may be accessed in any desired manner that is at least in pan independent of the virtual machine. Thus, in one optional embodiment, the data may be accessed independent of the virtual machine. It should be noted that the access may include reading the data, writing to the data and/or any other accessing, for that matter.

In addition, accessing the data at least partly independent of the virtual machine may include accessing the data without necessarily utilizing, the virtual machine, in one embodiment. For example, in one possible embodiment, the data may be accessed while the virtual machine is disabled. In such embodiment, the virtual machine may not necessarily be executed for use in accessing the data. In another embodiment, the data may be accessed utilizing a device (e.g. remote device, etc.) on which the virtual machine is not installed.

In one embodiment, the data may be accessed by parsing (e.g. decoding) the virtual disk. Optionally, the virtual disk may be parsed by parsing, virtual disk files of the virtual disk. For example, a file format used to encapsulate an image of the virtual disk (e.g. into a virtual disk file) may be parsed. To this end, the parsing may allow raw data sectors of the virtual disk to be identified.

In another embodiment, the data may be accessed based on a further parsing of the data. For example, the raw data sectors may be parsed for identifying a partitioning of the virtual disk. In this way, the data may be accessed based on the partitioning of the virtual disk.

In yet another embodiment, the data may be accessed based on a file system structure utilized by the virtual disk. For example, a file system [e.g. file allocation table (FAT) file system, (new technology file system) NTFS, hierarchical file system (HFS), third extended file system (ext3), etc.] utilized to format each identified partition of the virtual disk may be identified. Such file system may be identified based on the further parsing of the data described above, as an option.

In still yet another embodiment, the data may be accessed utilizing a hierarchical directory associated with the file, system. Such hierarchical directory may represent the file system, as an option. In this way, the data may be included in a hierarchical directory of the virtual disk. To this end, the hierarchical directory may be constructed according to the file system structure utilized by the virtual disk, such that the data may be accessed via the hierarchical directory.

In another embodiment, the data may be accessed utilizing a registry of the virtual disk. For example, the data may be included in such registry. The further parsing of the data (e.g. the raw data sectors) described above may identify registry files included in such data. The registry files may therefore be used to construct a registry of the virtual disk, such that data within the registry may be accessed via the registry.

In yet another embodiment, the data may be accessed by translating a path to the data. Such path may be translated from a path indicating a location on the physical system to a path indicating a location on the virtual disk. For example, if the data is accessed via the constructed registry, the path to the data may be translated into a path associated with the data actually stored in the registry of the virtual disk.

Further, a security or maintenance operation is performed in association with the accessed data, as shown in operation 304. Thus, in one embodiment, the security operation may be performed in association with the accessed data. For example, the security operation may include scanning the data (e.g. registry, file system, etc. represented by the data) for unwanted data, such as malware (e.g. viruses, worms, etc.), spyware, etc. As another example, the security operation may include cleaning the data of such unwanted data (e.g. by removing the unwanted data, etc.).

As yet another example; the security operation may include scanning, the data for vulnerabilities (e.g. vulnerable operating system files, application files, etc.) and/or remedying any identified vulnerabilities, such as by replacing vulnerable data with non-vulnerable data. As still yet another example, the security operation may include performing a static analysis of any of the data that includes executable code. Optionally, operating system code, application code and/or any other executable code may be analyzed utilizing static rules for identifying unwanted data, inappropriate coding techniques, etc. In addition, the static analysis may be performed as a background task and/or in non-real-time.

In another embodiment, the maintenance operation may be performed in association with the accessed data. Just by way of example, the maintenance operation may include deleting data that includes temporary files, defragmenting the data, identifying and fixing file system errors associated with the data, etc. Thus, the maintenance operation may optionally increase an efficiency in which an operating system of the virtual machine executes, may reduce a size of data stored on the virtual disk, etc.

As another example, the maintenance operation may include updating the data. As an option, the data may include security system files (e.g. anti-virus, etc.) that are updated, such that the virtual machine may be provided, with updated protection when the virtual machine is started. Thus, the virtual machine may be prevented from executing during a period of reduced protection before such update is performed.

As yet another example, the maintenance operation may include an audit of the data stored on the virtual disk (e.g. of a number of copies of operating systems, applications, etc. utilized by the virtual disk), a verification that the data is in compliance with associated licenses, etc. As still yet another example, the maintenance operation may include installing an application, updating policies (e.g. access rights, etc.), updating security software installed on the virtual disk, etc. Of course, it should be noted that while various examples of security and maintenance operations have been described herein, any desired security and/or maintenance operation may be performed in association with the accessed data.

Thus, as described above, a security or maintenance operation is performed in association with virtual disk data accessed at least partially independent of a virtual machine. Preventing use of the virtual machine for accessing the data may optionally increase efficiency by allowing the security or maintenance operation to be performed without necessarily waiting for an operating system of the virtual machine to fully boot. As another option, preventing use of the virtual machine for accessing the data may limit processing and/or memory resources consumed.

Further, in one embodiment, data on multiple virtual disks associated with different virtual machines on a single physical system may also be capable of being accessed in parallel (e.g. for installation of new applications, etc.), even when the physical system is incapable of executing such virtual machines in parallel. Moreover, performing a security operation which scans the data on the virtual disk for unwanted data may allow unwanted data to be identified prior to execution of the virtual machine, such that propagation of unwanted data (e.g. a virus), and/or hiding of unwanted data (e.g. a root-kit) via execution of the virtual machine may be prevented.

Still yet, performing a security operation which identifies and/or remedies vulnerabilities may allow precautionary measures to be taken with respect to the virtual machine, such that the virtual machine may be executed without risk of such vulnerabilities being exploited. As yet another option, a dedicated or ad-hoc image scanning system for performing an analysis of the data on the virtual disk separate from the physical system on which the virtual machine is located may be established in conjunction with a storage area network (SAN), such that shared storage may be passed along a pipeline between such image scanning system and physical system.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
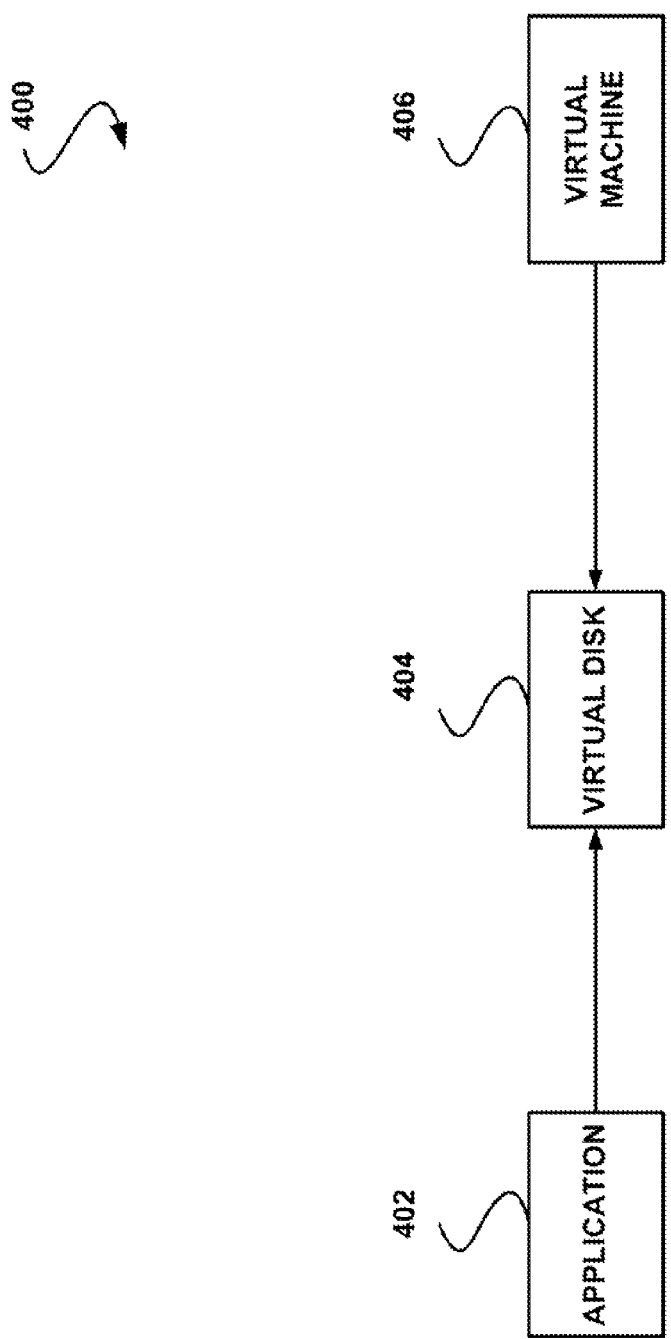
FIG. 4 shows a system for performing a security or maintenance operation in association with virtual disk data accessed independent of a virtual machine, in accordance with another embodiment.

FIG. 4 shows a system 400 for performing a security or maintenance operation in association with virtual disk data accessed independent of a virtual machine, in accordance with another embodiment. As an option, the system 400 may be implemented in the context of FIGS. 1-3. Of course, however, the system 400 may be implemented in an desired environment it should also be noted that the aforementioned definitions may apply during the present description.

As shown, an application 402 is capable of accessing a virtual disk 404 independent of a virtual machine 406. In the context of the present embodiment, the application 402 may include any application capable of accessing data stored on the virtual disk 404. For example, the application 402 may include a security system (e.g. anti-virus system, etc.) for identifying unwanted data on the virtual disk 404.

In one embodiment, the application 402, virtual disk 404 and virtual machine 406 may be located on a single device (e.g. such as any of the devices described above with respect to FIGS. 1 and/or 2). Of course, the application 402 may also be located on a device separate from another device on which the virtual disk 404 and virtual machine 406 are located.

In another embodiment, the virtual disk 404 may store data (e.g. operating system files, registry files, etc.) utilized by the virtual machine 406. Thus, execution of the virtual machine 406 may provide access to data stored on the virtual disk 404. For example, the virtual machine 406 may format the data into hierarchical data structures, registries, etc.

However, as noted above, the application 402 may also access the data on the virtual disk 404 independently from the virtual machine 406. In one embodiment, the application 402 may parse the data stored on the virtual disk 404 for identifying; raw data sectors of the virtual disk 404. In another embodiment, the application 402 may further parse the raw data sectors for identifying any partitions of the virtual disk 404 and file systems utilized by such partitions. Accordingly, the application 402 may construct the data associated with each partition into a hierarchical data structure indicated by an associated file system.

Furthermore, the application 402 may utilize the parsed raw data sectors for identifying registry files included in the virtual disk 404. The registry files may optionally be utilized for constructing a registry used by the virtual machine 406. To this end, the application 402 may perform a security or maintenance operation on the constructed hierarchical data structure and/or registry independently of the virtual machine 406.

Figure 5:
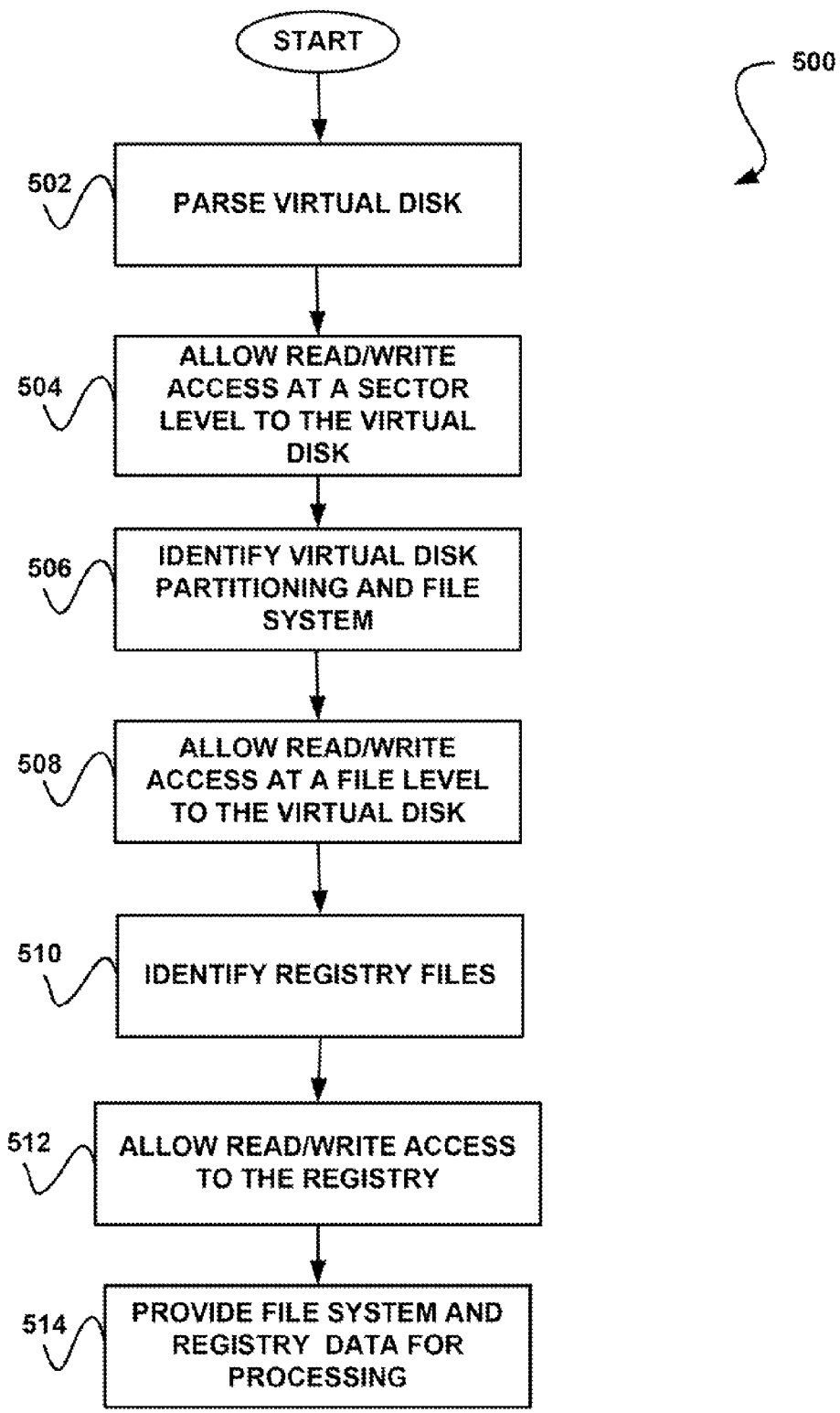
FIG. 5 shows a method for providing, independent of a virtual machine, file system and registry data from a virtual disk for processing, in accordance with yet another embodiment.

FIG. 5 shows a method 500 for providing, independent of a virtual machine, file system and registry data from a virtual disk for processing, in accordance with yet another embodiment. As an option, the method 500 may be carried out in the context of the functionality and architecture of FIGS. 1-4. For example, the method 500 may be carried out utilizing the application 402 of FIG. 4. Of course, however, the method 500 may be carried out in any desired environment. Again, it should also be noted that the aforementioned definitions may apply during the present description.

As shown in operation 502, a virtual disk is parsed. In one embodiment, the virtual disk may be parsed by parsing files located on the virtual disk. Such virtual disk files may be encoded (e.g. formatted) for encapsulating an image of the virtual disk. For example, the virtual disk files may be encoded in any desired format. In various embodiments, the virtual disk files may be encoded utilizing a virtual machine disk format (VMDK), virtual hard disk format (VHD) etc.

Optionally, the virtual disk files may be sparse. Just by way of example, such virtual disk files may not necessarily contain every sector that makes up the virtual disk, but instead may only include the sectors that have been written to. A sector that is non-existent with respect to a virtual disk file may indicate that the sector has never been used and that a virtual machine associated with the virtual disk may provide a sector full of zeroes if the sector is read.

To this end, parsing the virtual disk may include parsing the encoding of, or otherwise decoding, the virtual disk files to identify data stored in such files. For example, the data may be in the form of raw data sectors. In this way, raw data sectors of the virtual disk may be identified from files stored on the virtual disk.

Additionally, read and write access to the virtual disk is provided at a sector level, as shown in operation 504. Just by way of example, by virtue of the identification of the raw data sectors, read and write access to such raw data sectors may be provided. The read and write access may allow operations to be performed on the raw data sectors, in one embodiment.

Further, as shown in operation 506, partitions of the virtual disk and file systems utilized by any of such partitions are identified. For example, the virtual disk may be partitioned and each partition may be formatted with one of any number of file systems (e.g. FAT, NTFS, HFS, ext3, etc.). Thus, a file system utilized by the virtual machine may be indicated by the identified partitions and associated file systems.

To this end, the raw data sectors may be accessed for identifying the partitions and associated file system structures. For example, parsing the raw data sectors may provide the partitions and associated file systems utilized by the virtual disk. It should be noted that the raw data sectors may be parsed in any desired manner.

In one embodiment, the raw data sectors may be directly parsed (e.g. parsed manually). In another embodiment; the raw data sectors may be parsed utilizing an operating system of a physical system on which the virtual disk is located. For example, the virtual disk may be indicated to the operating system as a physical disk, such that file systems of the operating system may mount partitions of the virtual disk. Of course, it should be noted that the raw data sectors may be parsed both directly and via the operating system, such as, for example, where the file system used on the virtual disk is not one that is capable of being utilized by the operating system.

Still yet, read and write access of the data stored on the virtual disk is allowed at a file level. Note operation 508. For example, such read and write access may be allowed at the file level utilizing the identified partitions and associated file systems. In one embodiment, the identified partitions and associated file systems may be utilized for constructing the data in each partition according to an associated file system. Thus, for example, a hierarchical data structure (e.g. directory structure, etc.) of the data may be constructed, such that the read and write access to the data may be provided via the hierarchical data structure. As an option, the hierarchical data structure may represent the file system utilized by the virtual machine.

Additionally, registry files are identified, as shown in operation 510. In the context of the present embodiment, the registry files may include any files stored on the virtual disk that are utilized as a registry by the virtual machine. Such registry files may be identified in any desired manner.

In one embodiment, the registry files may be identified by parsing the raw data sectors optionally identified in operation 502. In another embodiment, the registry files may be identified by parsing the hierarchical data structure optionally constructed in operation 508. For example, a portion of the hierarchical data structure may include the registry files.

Optionally, the parsing may be directly (e.g. manually) performed. As another option, the parsing may be performed at least partially by the operating system of the physical system. For example, the operating system may be instructed, to load file system data (identified in operation 506) for parsing such file system data.

Further, the registry may be constructed utilizing the identified registry files. Just by way of example, the registry files may be loaded into a portion of a physical registry of the physical system. A number of keys and links may then be set in another portion of the physical registry to emulate the registry included in the virtual disk that is utilized by the virtual machine. In this way, the physical registry may include the registry utilized by the virtual machine.

Optionally, the registry files may only be identified if a security or maintenance operation involving the registry is to be performed. For example, in order to scan or patch the virtual machine, access to the registry may be required for identifying configuration data associated with the virtual machine. To this end, read and write access may be allowed with respect to the registry. Note operation 512. For example, access to data stored in the virtual disk may be provided at a registry level.

Moreover, file system and registry data is provided for processing, as shown in operation 514. For example, the constructed file system and the constructed registry may be allowed to be accessed for performing a security operation or a maintenance operation on any portion thereof. Of course, it should be noted that both a security operation and a maintenance operation may be performed on the file system and/or registry data.

As an option, the file system and registry data may be translated prior to performance of the security operation or maintenance operation. For example, the file system and registry data may be translated based on an application utilized, to perform such security operation or maintenance operation. The translation may provide the file system and registry data in a format capable of being processed by the application, in one embodiment. Just by way of example, a value in the virtual machine registry may refer to a file called "c:\windows\something.dll". However, from the point of view of the virtual machine, "c:\windows\something.dll" may be its own file, such that a translation of the path may be utilized for preventing such file from being confused with the \windows\something.dll that is present on the virtual disk.

In one embodiment, the application utilized to perform the security operation or maintenance operation may be modified to perform the translation. For example, application program interfaces (APIs) may be provided with the application for performing the translation. In another embodiment, the application may continue to use path names it understands (e.g. (c:\windows\something.dll, HKLM\Software\Microsoft). However, the path names may be translated into accesses against the virtual disk and registry. For example, APIs that the application calls may be hooked for performing the translation. As another example, if the operating system of the physical system if utilized in accessing the data stored on the virtual disk (e.g. as described in operations 502 and 506), interception functions provided by the operating system may intercept application calls such that the operating system may perform the translations.

Figure 6:
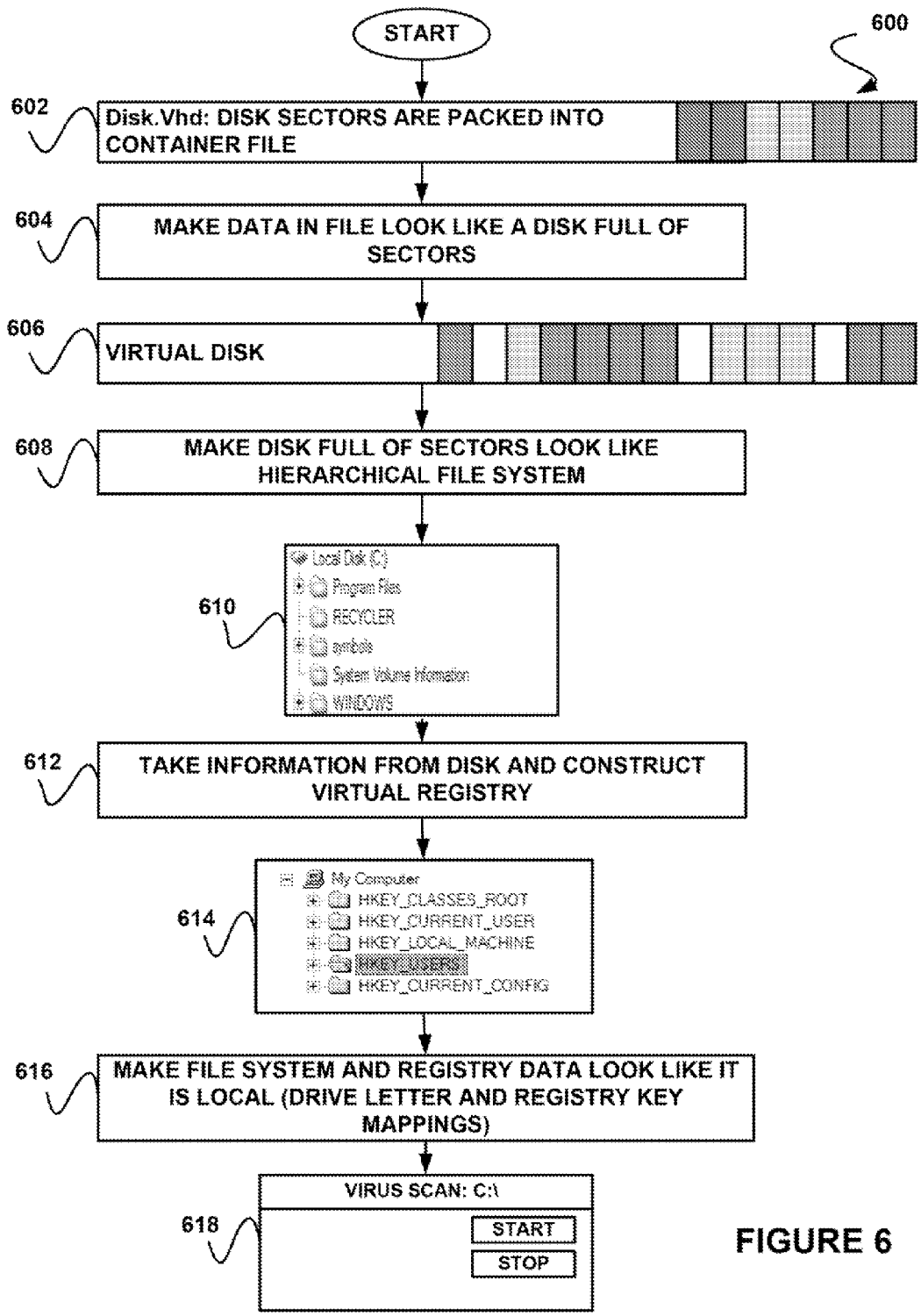
FIG. 6 shows a method for constructing virtual file system and registry data independently of a virtual machine, in accordance with still yet another embodiment.

FIG. 6 shows a method 600 for constructing virtual file system and registry data independently of a virtual machine, in accordance with still yet another embodiment. As an option, the method 600 may be carried out in the context of the functionality and architecture of FIGS. 1-5. Of course, however, the method 600 may be carried out in any desired environment. Again, it should also be noted that the aforementioned definitions may apply during, the present description.

As shown in operation 602, sectors of a virtual disk are packed into a container file. The sectors may store any data associated with a virtual machine that utilizes the virtual disk. In addition, the container file may include a virtual disk file that encapsulates an image of the virtual disk.

Further, data in the container file is made to appear as though the virtual disk is tilled with sectors, as shown in operation 604. For example, if a sector of the virtual disk has not yet been written to, such sector may not exist in the virtual disk. Thus, in one embodiment, a non-existent sector may be created. For example, the created sector may be filled with a plurality of zeroes. Item 606 shows the virtual disk as it appears after any non-existent sectors are created.

Additionally, the virtual disk that is full of sectors is made to appear as a hierarchical file system, as shown in operation 608. In one embodiment, the hierarchical file system may include a directory of the data stored in the virtual disk. Optionally, raw data sectors of the virtual disk may be parsed for identifying partitions of the virtual disk and file systems associated with such partitions. The identified partitions and associated file systems may thus be utilized for constructing the hierarchical the system.

Item 610 shows an exemplary image of a hierarchical file system constructed utilizing the sectors of the virtual disk. As shown, the hierarchical file system may represent a drive included in the virtual disk, along with various files within such drive. Of course, it should be noted that the hierarchical file system may include any information stored on the virtual disk.

Still yet, information from the virtual disk is utilized to construct a virtual registry, as shown in operation 612. In one embodiment, the hierarchical file system may be utilized for identifying, registry files stored on the virtual disk. Such registry files may thus be utilized for constructing the virtual registry. Item 614 illustrates an example of a registry constructed from information stored on the virtual disk.

Moreover, the file system data and registry data are made to appear local to the virtual disk. Note operation 616. As shown, a drive letter mapped to the hierarchical file system may include a drive that is local to the virtual disk. In addition, registry keys included in the registry may be mapped to data stored in the virtual disk. Item 618 shows an example of a local disk drive that is mapped to a hierarchical file system being scanned for viruses. To this end, a security operation may be performed on the hierarchical file system and/or the registry of the virtual disk independent of the virtual machine associated with such virtual disk.

FIGS. 7A-D show views of registries during construction of a virtual registry utilizing a host registry, in accordance with another embodiment. As an option, the registries may be implemented in the context of the functionality and architecture of FIGS. 1-6. Of course, however, the registries may be implemented in any desired environment. Yet again, it should also be noted that the aforementioned definitions may apply during the present description.

Figure 7A:
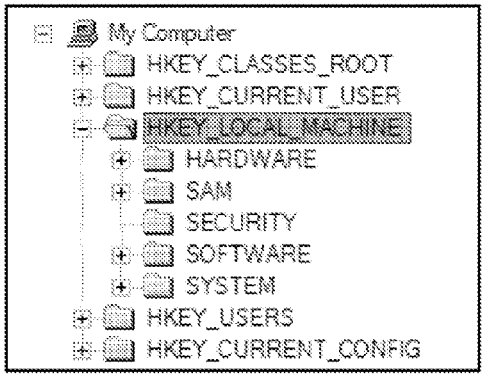
FIGS. 7A-D show views of registries during construction of a virtual registry utilizing a host registry, in accordance with another embodiment.

FIG. 7A illustrates a registry of a physical system, herein referred to as a host registry. As shown, the host registry is formatted in a hierarchical structure. In addition, the host registry includes a plurality of keys associated with various resources (e.g. hardware, software, etc.) of the physical system.

Figure 7B:
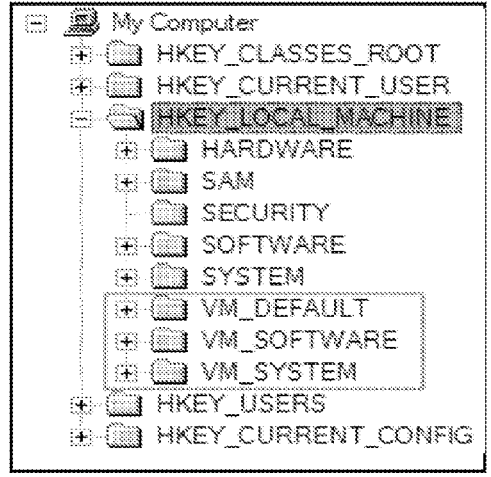

FIG. 7B illustrates the host registry of FIG. 7A with registry files from a virtual disk imported within such host registry. For example, registry files identified within the virtual disk, herein referred to as virtual registry files, may be imported into the host registry. As shown, the virtual registry files may include a "VM_DEFAULT" registry key, a "VM_SOFTWARE" registry key and a "VM_SYSTEM" registry key. The virtual registry files may be loaded into the host registry under a key existing within the host registry. For example, as shown, the virtual registry files may be imported into the host registry under the registry key associated with the local machine of the physical system.

Figure 7C:
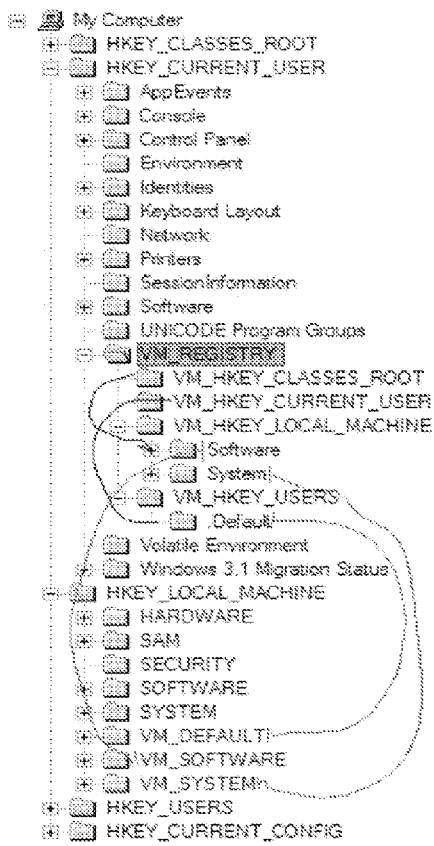

FIG. 7C illustrates the host registry of FIG. 7B in which keys and links have been constructed for building a complete virtual registry within the host registry. For example, keys may be created within a newly constructed virtual registry portion of the host registry. Further, such keys may be linked to the registry files imported into the host registry shown in FIG. 7B.

Figure 7D:
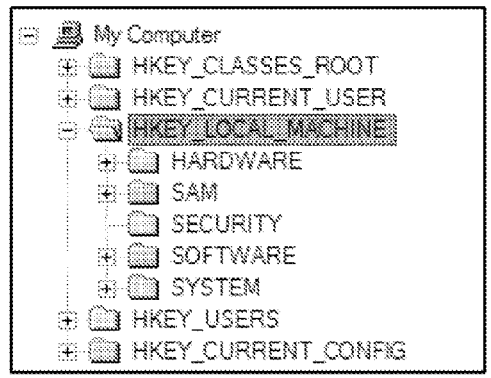

FIG. 7D illustrates the constructed virtual registry. An application accessing the virtual registry to perform a security or maintenance operation thereon may only see the constructed virtual registry portion of the host registry. Thus, the application may view the virtual registry as a complete registry that is local to the physical system. Optionally, the remaining portion of the host registry may be hidden from the application.

Figure 8:
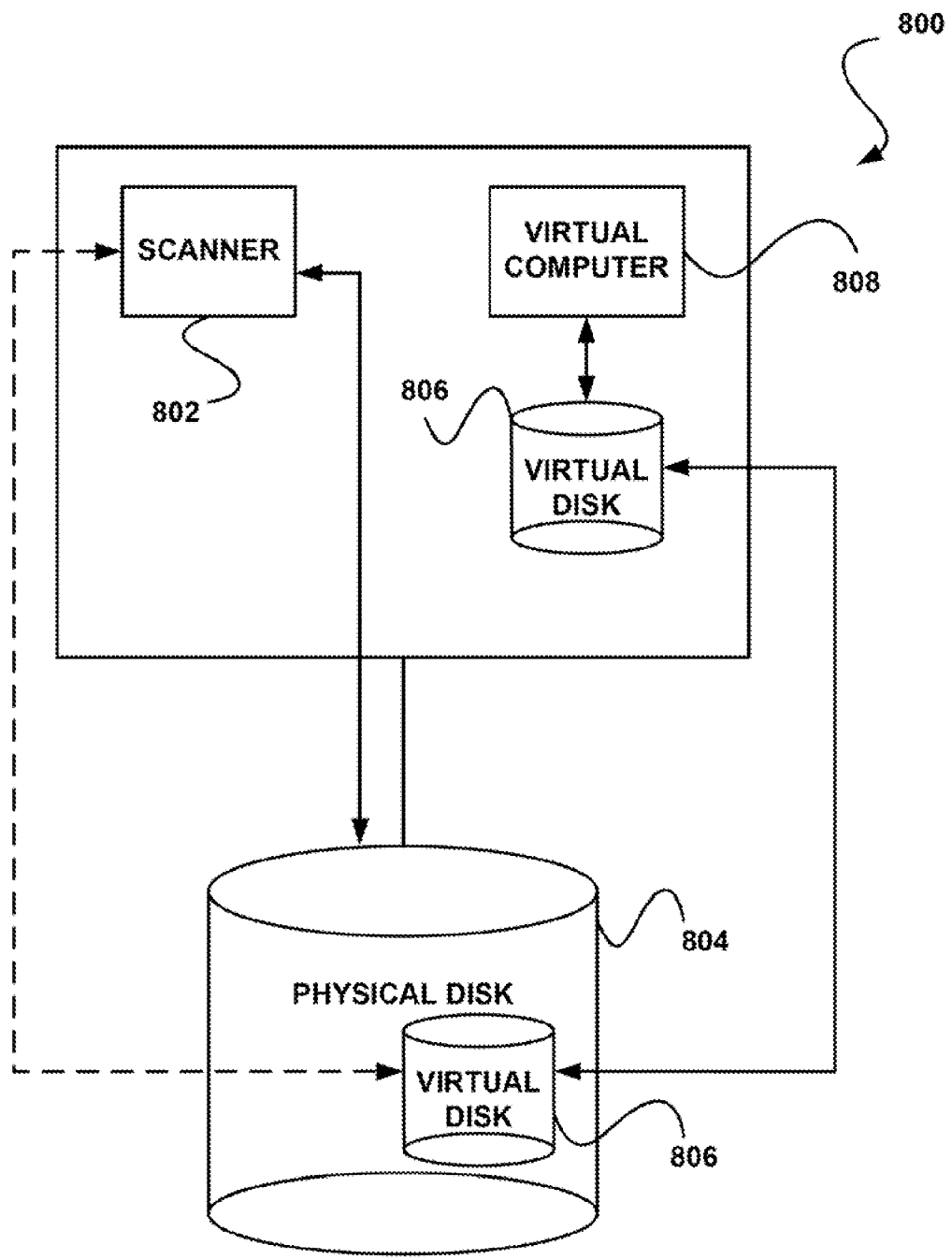
FIG. 8 shows a physical computer system for performing a security operation utilizing a scanner with respect to virtual disk data, in accordance with yet another embodiment.

FIG. 8 shows a physical computer system 800 for performing a security operation utilizing a scanner with respect to virtual disk data, in accordance with yet another embodiment. As an option, the physical computer system 800 may be implemented in the context of the functionality and architecture of FIGS. 1-7. Of course, however, the registries may be implemented in any desired environment. Yet again, it should also be noted that the aforementioned definitions may apply during the present description.

As shown, the physical computer system 800 includes a scanner 802 capable of scanning data. The scanner 802 is in communication with a physical disk 804 of the physical computer system 800. In this way, the scanner 802 may scan data stored in the physical disk 804 (e.g. for unwanted data, etc.).

A virtual disk 806 is located in a partition of the physical disk 804. The virtual disk 806 may store data utilized by a virtual computer 808. Thus, the virtual computer 808 may be utilized for accessing data stored on the virtual disk 806 such that security and/or maintenance operations may be performed on such data. While the scanner 802 has been shown to be included in the physical computer system 800, it should be noted that the scanner 802 may also be located on another computer system (not shown) that is remote to the virtual computer 808 and/or virtual disk 806.

As also shown, the scanner 802 may also access the data stored on the virtual disk 806 independently of the virtual computer 808. For example, the data stored on the virtual disk 806 may be processed (e.g. parsed, etc.) for configuring the data into a format capable of being scanned by the scanner 802. Optionally, a path to the data may be translated from a path indicating that the data is stored on the physical disk 804 to a path indicating that the data is stored on the virtual disk 806. To this end, the scanner 802 may scan the data stored on the virtual disk 806 independently from an operation of the virtual computer 808.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising the steps of:
   identifying a virtual disk that is associated with a virtual machine, without employing the virtual machine;
   parsing the virtual disk without employing the virtual machine;
   providing read and write access to the virtual disk at a file level or sector level;
   identifying one or more registry files on the virtual disk, where one or more of the identified registry files are associated with the virtual machine;
   providing read and write access to one or more of the identified registry files that are associated with the virtual machine, such read and write access to a registry file being provided to software outside of the virtual machine; and
   using the read or write access to a registry file in order to perform security operations for the benefit of the virtual machine without employing the virtual machine.

2. The method of claim 1 wherein the parsing step includes parsing files on the virtual disk and encoding the files for encapsulating an image of the virtual disk.

3. The method of claim 2 wherein the encoding uses VMDK or VHD.

4. The method of claim 1 further comprising the step of identifying partitions of the virtual disk.

5. The method of claim 4 further comprising the step of determining the file systems used by the identified partitions.

6. The method of claim 4 wherein the virtual machine and virtual disk are resident upon a physical computer having an operating system that is not part of the virtual machine.

7. The method of claim 6 further comprising the step of using the operating system to determine the file systems used by the identified partitions.

8. The method of claim 4 wherein the partitions are determined during the parsing step.

9. The method of claim 1 wherein the virtual machine and virtual disk are resident upon a physical computer having an operating system that is not part of the virtual machine.

10. The method of claim 9 wherein virtual machine registry information is incorporated in a registry file outside of both the virtual machine and virtual disk.

11. The method of claim 1 wherein access to registry files is allowed after a successful security check associated with the software receiving such access.

12. In a computer system comprising a virtual machine and virtual disk associated with an operating system that is not part of the virtual machine, a method comprising the steps of:
   Employing a security application, associated with the operating system and not part of the virtual machine, to pack sectors of the virtual disk into a container file;
   Causing data in the container file to appear as a disk full of sectors to enable display of such data as part of a hierarchical file system; and
   Using the security application to construct a virtual registry and cause the virtual registry and the hierarchical file system to appear local on the virtual disk from the perspective of the virtual machine.

13. A computer system for performing security operation:
   a virtual computer;
   a scanner residing on a first computer platform and not part of the virtual computer, the scanner capable of performing security scanning on data;
   a physical disk comprising a virtual disk in a partition of the physical disk, which resides on a second computer platform;
   the virtual computer being coupled to the virtual disk; and
   a communicative coupling between the scanner and the physical disk, such communicative coupling providing access to the virtual disk without employing the virtual computer.

14. The computer system of claim 13 wherein the first computer platform and the second computer platform are the same.

15. The computer system of claim 13 wherein the first computer platform comprises a security application and the scanner is a part of the security application.

16. The computer system of claim 13 wherein the virtual computer uses the virtual disk as a repository for data.

17. The computer system of claim 16 wherein the virtual disk comprises registry information regarding the virtual computer.

18. The computer system of claim 17 wherein the scanner is part of an application that accesses the registry information for purpose of a security operation.

19. The computer of claim 16 wherein the registry information is identified during a parsing operation of the physical disk.

* * * * *